US007968505B2

(12) United States Patent
Liu et al.

(10) Patent No.: US 7,968,505 B2
(45) Date of Patent: *Jun. 28, 2011

(54) LUBRICANT (75) Inventors: Jianwei Liu, Fremont, CA (US); Michael Joseph Stirniman, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 12/055,946

(22) Filed: Mar. 26, 2008

(65) Prior Publication Data

US 2008/0305975 A1    Dec. 11, 2008

Related U.S. Application Data

(62) Division of application No. 10/912,561, filed on Aug. 6, 2004, now Pat. No. 7,371,474.

(51) Int. Cl.
*C10M 147/04*    (2006.01)
*C10M 149/18*    (2006.01)

(52) U.S. Cl. ........ 508/591; 508/422; 508/425; 508/427; 508/430; 508/548; 508/551; 508/560; 508/564

(58) Field of Classification Search .............. 508/243, 508/422, 545, 548, 564, 579, 591, 425, 427, 508/430, 551, 560
See application file for complete search history.

(56) References Cited

U.S. PATENT DOCUMENTS

| | | | |
|---|---|---|---|
| 5,030,478 A | 7/1991 | Lin et al. | |
| 5,273,830 A | 12/1993 | Yaguchi et al. | |
| 5,587,217 A * | 12/1996 | Chao et al. | 428/835.7 |
| 5,741,577 A | 4/1998 | Yamamoto et al. | |
| 6,096,385 A | 8/2000 | Yong et al. | |
| 6,099,762 A | 8/2000 | Lewis | |
| 6,132,875 A | 10/2000 | Kiuchi et al. | |
| 6,403,149 B1 | 6/2002 | Parent et al. | |
| 6,602,570 B1 * | 8/2003 | Ma et al. | 428/834 |
| 6,753,060 B1 * | 6/2004 | Liu et al. | 428/833.5 |
| 6,984,422 B2 | 1/2006 | Liu et al. | |
| 7,060,377 B2 | 6/2006 | Liu et al. | |
| 2002/0114980 A1 | 8/2002 | Gunsel et al. | |
| 2005/0170215 A1 | 8/2005 | Liu et al. | |

FOREIGN PATENT DOCUMENTS

JP    06068455 A  *  3/1994

* cited by examiner

*Primary Examiner* — Glenn A Caldarola
*Assistant Examiner* — Taiwo Oladapo
(74) *Attorney, Agent, or Firm* — Arent Fox LLP (57) ABSTRACT

A magnetic recording medium comprising a lubricant film comprising a photosynthesized lubricant having a single phase composition of at least a lubricant moiety and an additive moiety is disclosed.

2 Claims, 10 Drawing Sheets

Cross Section of Disc

LUBRICANT

This application is a divisional of application Ser. No. 10/912,561, filed Aug. 6, 2004, now pending.

FIELD OF THE INVENTION

The present invention relates to a recording media having an advanced lubricant for thin film storage medium, wherein the advanced lubricant is a single phase composition of at least a lubricant moiety and an additive moiety.

BACKGROUND

Magnetic discs with magnetizable media are used for data storage in most all computer systems. Current magnetic hard disc drives operate with the read-write heads only a few nanometers above the disc surface and at rather high speeds, typically a few meters per second. Because the read-write heads can contact the disc surface during operation, a layer of lubricant is coated on the disc surface to reduce wear and fiction.

Figure 1:
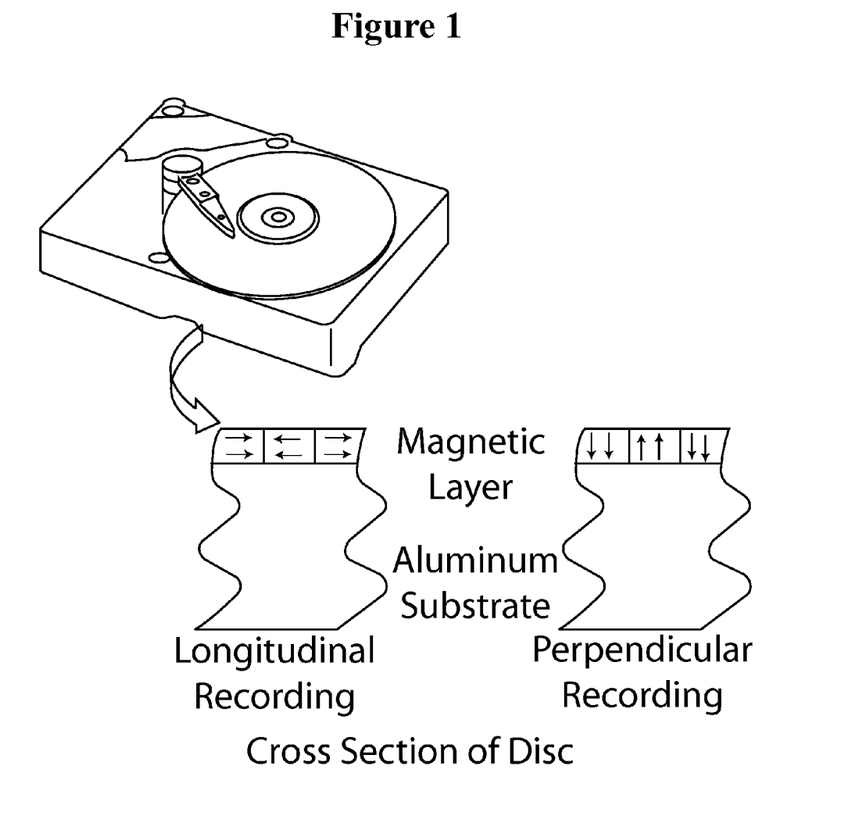
FIG. 1 shows a magnetic recording medium.

FIG. 1 shows a disk recording medium and a cross section of a disc showing the difference between longitudinal and perpendicular recording. Even though FIG. 1 shows one side of the non-magnetic disk, magnetic recording layers are sputter deposited on both sides of the non-magnetic aluminum substrate of FIG. 1. Also, even though FIG. 1 shows an aluminum substrate, other embodiments include a substrate made of glass, glass-ceramic, NiP/aluminum, metal alloys, plastic/polymer material, ceramic, glass-polymer, composite materials or other non-magnetic materials.

Generally, the lubricant is applied to the disc surface by dipping the disc in a bath containing the lubricant. The bath typically contains the lubricant and a coating solvent to improve the coating characteristics of the lubricant, which is usually viscous oil. The discs are removed from the bath, and the solvent is allowed to evaporate, leaving a layer of lubricant on the disc surface.

The lubricant film on hard discs provides protection to the underlying magnetic alloy by preventing wear of the carbon overcoat. In addition, it works in combination with the overcoat to provide protection against corrosion of the underlying magnetic alloy. Reliability of hard disks is depends on the durability of the thin film media. As the spacing between head disk is being reduced aggressively to improve area storage density, media are facing many severe technical obstacles, such as weak durability, heavy lubricant pickup, unmanageable stiction/friction, etc. Lubrication plays unquestionably an important role in overcoming these technical difficulties.

Because the thickness of the carbon overcoat and lubricant protective layers is being reduced continuously, a more integrated protection structure is needed. Lubrication additive moieties, such as Bis(4-fluorophenoxy)-tetrakis(3-trifluoromethyl phenoxy)cyclotriphosphazene (XI-p) can improve tribological performance and corrosion resistance of thin film media. Dip-lubrication is a process which includes immersing disks into a solution containing both lubricant moieties and additive moieties, and then slowly removing disks from the lubricant solution, or alternatively, slowly draining the solution away from the disks. The amount of lubricant moieties and additive moieties adsorbed on the disk overcoat is controlled by varying the solution concentration and the drain rate. However, the X1-p moiety is sparingly soluble in the perfluoropolyether (PFPE) lubricant moieties, resulting in a two-phase lubricant moiety/additive moiety system. The use of such a two-phrase system can lead to phrase separation of the additive moieties on the disk, resulting in flyability issues with read-write head. To eliminate these performance problems, lubricant moieties (such as Zdol, defined below) can be linked directly to a cyclotriphosphazene moiety by a chemical synthetic method. However, typical chemical synthesis process to couple cyclotriphosphazene moiety with a lubricant moiety involves multiple-step chemical reactions. In addition, complicated and time-consuming purification is required afterward. Yield of the multiple-step reactions is also undesirable low.

SUMMARY OF THE INVENTION

One embodiment of this invention is a photosynthesized lubricant having a single phase composition of at least a lubricant moiety and an additive moiety, wherein a molecule of the photosynthesized lubricant comprises a main-chain of one or more a perfluoropolyether (PFPE) moieties, with one end of the molecule having a pentaphenoxy cyclotriphosphazene.

Another embodiment of this invention relates to a magnetic recording medium comprising a lubricant film comprising a photosynthesized lubricant having a single phase composition of at least a lubricant moiety and an additive moiety. Preferably, a molecule of the photosynthesized lubricant comprises a main-chain of one or more a perfluoropolyether (PFPE) moieties, with one end of the molecule having a pentaphenoxy cyclotriphosphazene. Preferably, the other end of the molecule has a chemical group that can enhance bonding on carbon overcoat. Preferably, the chemical group is selected from the group consisting of a singe hydroxyl, a multiple hydroxyl, an amide, and combinations thereof. Preferably, the one or more PFPE moieties comprises Ztetraol.

The magnetic recording medium could further comprise a magnetic recording layer and a carbon overcoat layer on the magnetic layer, wherein the lubricant film is located on the carbon overcoat layer. Preferably, the molecule has an FTIR spectrum showing that the molecule comprises cyclophosphazene and PFPE moieties. Preferably, the molecule has a GPC spectrum showing only one peak. Preferably, the cyclophosphazene moieties comprise bis(4- fluorophenoxy) tetrakis (3-trifluoromethylphenoxy) cyclotriphosphazene. Preferably, the lubricant film exhibits substantially no phase separation after being exposed for 4 days in air at 80°C. and under 80 percent RH.

Yet another embodiment is a method of manufacturing a photosynthesized lubricant having a single phase composition of at least a lubricant moiety and an additive moiety, the method comprising forming a mixture of molecules of the lubricant moiety and molecules of the additive moiety and reacting the molecules of the lubricant moiety with the molecules of the additive moiety under UV exposure to form the photosynthesized lubricant.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention a property of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings, wherein.

DETAILED DESCRIPTION OF THE INVENTION

The invention is directed to a method of coating a substrate, particularly recording media (recording discs), with a solid lubricant, which is also referred in the specification to as a "lube." Lubricants typically are liquid and contain molecular weight components that range from several hundred Daltons to several thousand Daltons.

Figure 2:
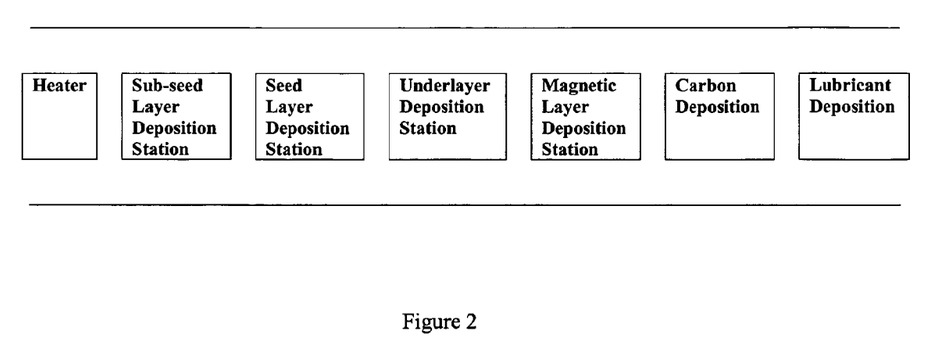
FIG. 2 shown an inline process for manufacturing magnetic recording media.

An inline process for manufacturing magnetic recording media is schematically illustrated in FIG. 2. The disc substrates travel sequentially from the heater to a sub-seed layer deposition station and a sub-seed layer is formed on the disc substrates. Then, the disc substrates travel to a seed layer station for deposition of the seed layer, typically NiA1. Subsequent to the deposition of the sub-seed layer and the seed layer, the disc substrates are passed through the underlayer deposition station wherein the underlayer is deposited. The discs are then passed to the magnetic layer deposition station and then to the protective carbon overcoat deposition station. Finally, the discs are passed through a lubricant film deposition station.

Almost all the manufacturing of the disks takes place in clean rooms, where the amount of dust in the atmosphere is kept very low, and is strictly controlled and monitored. The disk substrates come to the disk fabrication site packed in shipping cassettes. For certain types of media, the disk substrate has a polished nickel-coated surface. The substrates are preferably transferred to process cassettes to be moved from one process to another. Preferably, the cassettes are moved from one room to another on automatic guided vehicles to prevent contamination due to human contact.

The first step in preparing a disk for recording data is mechanical texturing by applying hard particle slurry to the polished surface of the substrate and to utilize proper tape materials on circumferential motion disk to create circumferentially texture grooves. This substrate treatment helps in depositing of a preferred underlayer crystallographic orientation and subsequently helps preferentially growth of magnetic recording material on the substrate. During the texturing process, small amounts of substrate materials get removed from surface of the disk and remain there. To remove this, the substrate is usually washed. Also, techniques for polishing the surface of the non-magnetic substrate of a recording medium use slurry polishing, which requires wash treatment. Thus, disk substrates are washed after texturing and polishing. However, wash defects could be one of the top yield detractors.

A final cleaning of the substrate is then done using a series of ultrasonic, megasonic and quick dump rinse (QDR) steps. At the end of the final clean, the substrate. has an ultra-clean surface and is ready for the deposition of layers of magnetic media on the substrate. Preferably, the deposition is done by sputtering.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

Sputtering leads to some particulates formation on the post sputter disks. These particulates need to be removed to ensure that they do not lead to the scratching between the head and substrate. Thus, a lube is preferably applied to the substrate surface as one of the top layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

Figure 3:
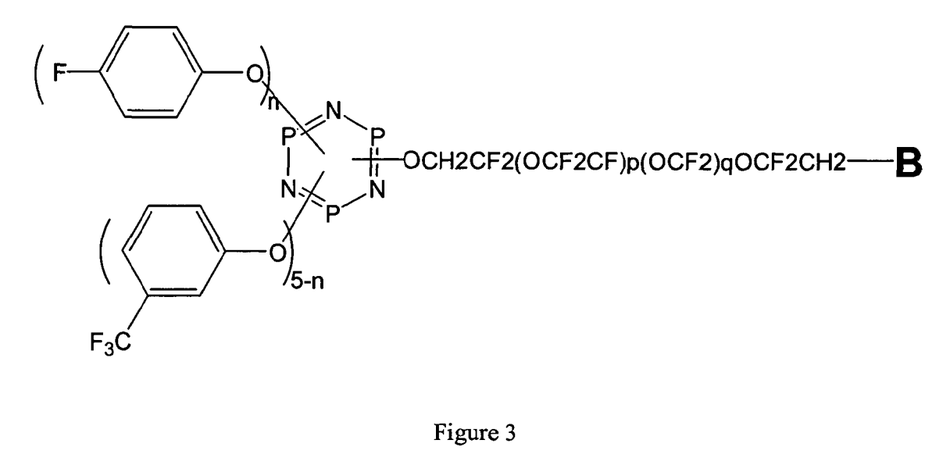
FIG. 3 shows the chemical structure of the invented lubricants, in which B are the bonding enhancing chemical groups, including hydroxyl, 2,3-dihydroxy-1-propoxyl and Acetamide.

The invention relates an advanced lubricant for recording media. The lubricant is made by a photochemical synthesis method using an ultraviolet (UV) system. The photosynthesized lubricant molecule contains a main-chain of perfluoropolyether (PFPE) moieties, with one end of the molecule having a pentaphenoxy cyclotriphosphazene, and the other end having chemical groups that can enhance bonding on carbon overcoat. The pentaphenoxy cyclotriphosphazene provides the medium good durability. The enhanced bonding groups include single or multiple hydroxyl, or amide chemical groups. FIG. 3 shows the chemical structure of the invented lubricants, in which B are the bonding enhancing chemical groups, including hydroxyl, 2,3-dihydroxy-1-propoxyl and acetamide.

X1p is the most widely used lubricant additive for thin film storage medium. The most remarkable benefit from X1p application is the significant improvement of durability of storage medium. However, the durability benefit of X1p is always accompanied by potential problems, such as X1p phrase separation, head smear and lubricant pickup. The root cause for these adverse effects is the limited miscibility of X1p in PFPE lubricant.

The inventors recognized that chemically linking lubricant molecules, such as Zdol, to the cyclotriphosphazene moiety could eliminate the low miscibility problems between lubricant and X1p. This solution could be achieved by normal chemical synthesis method, which involves multiple-step chemical reactions plus time-consuming purification process. Yield of the multiple-step reactions is also undesirable low.

Figure 4:
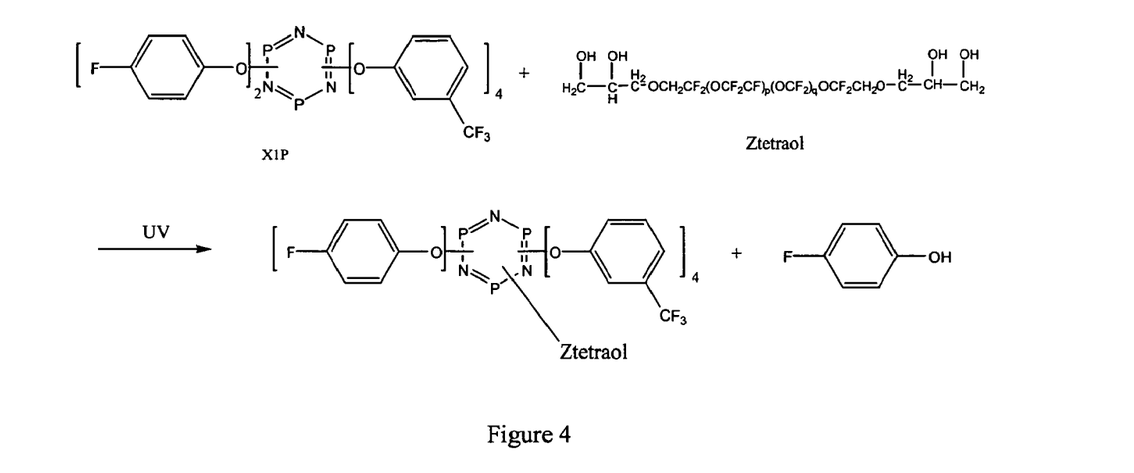
FIG. 4 shows a hydroxyl end-group of a PFPE lubricant moiety combine with an activated cyclotriphosphazene ring moiety to form a photosynthesized lubricant molecule.

The inventors unexpectedly found the course of this invention that UV light could activate X1p very effectively. The fluorophenol and trifluoromethylphenol substituents on the cyclotriphosphazene ring in X1p could be excited readily by UV exposure. A sequence of photochemical reactions could be triggered, involving shedding of the fluorophenol and trifluoromethylphenol substituents from the cyclotriphosphazene ring. In the case that PFPE lubricants are presented in the reaction system, the hydroxyl end-group from the lubricant could combine with the activated cyclotriphosphazene ring and form molecules with desirable structure as shown in FIG. 4.

For example, 50 grams of Ztetraol and 10 grams of X1p were dissolved in 200 ml of Vertrel Xf. Under cooling and nitrogen protection, the solution was exposed to UV exposure for more than 5 hours. After a standard workup and distillation using a Vertrel solvent, a clear lubricant oil was obtained.

Figure 5:
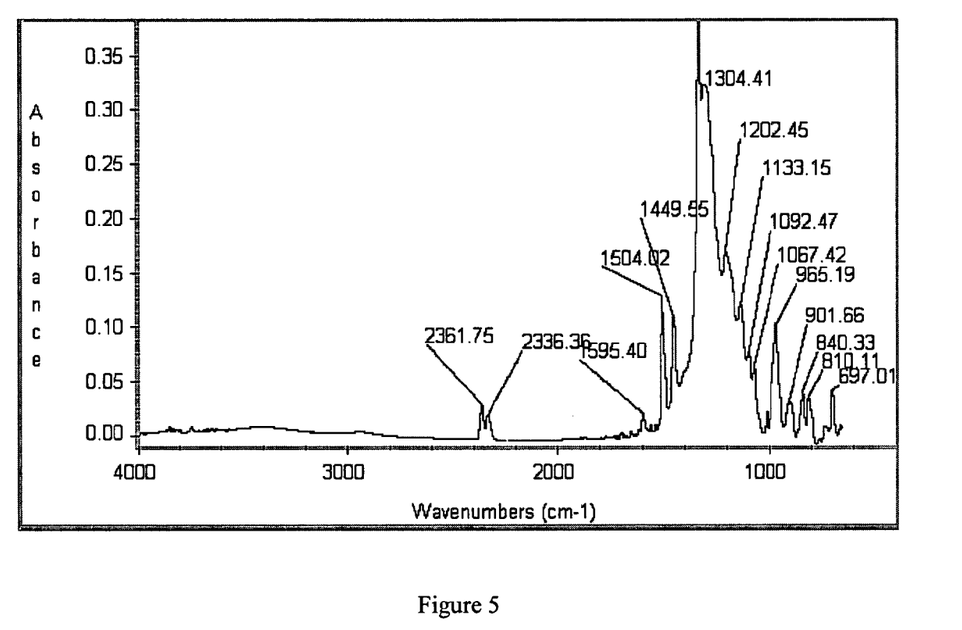
FIG. 5 shows the FTIR spectrum of an embodiment of the lubricant of this invention.

FIG. 5 is the FTIR spectrum of the obtained chemical. It reveals that the product contain both cyclophosphazene and PFPE moieties.

Figure 6:
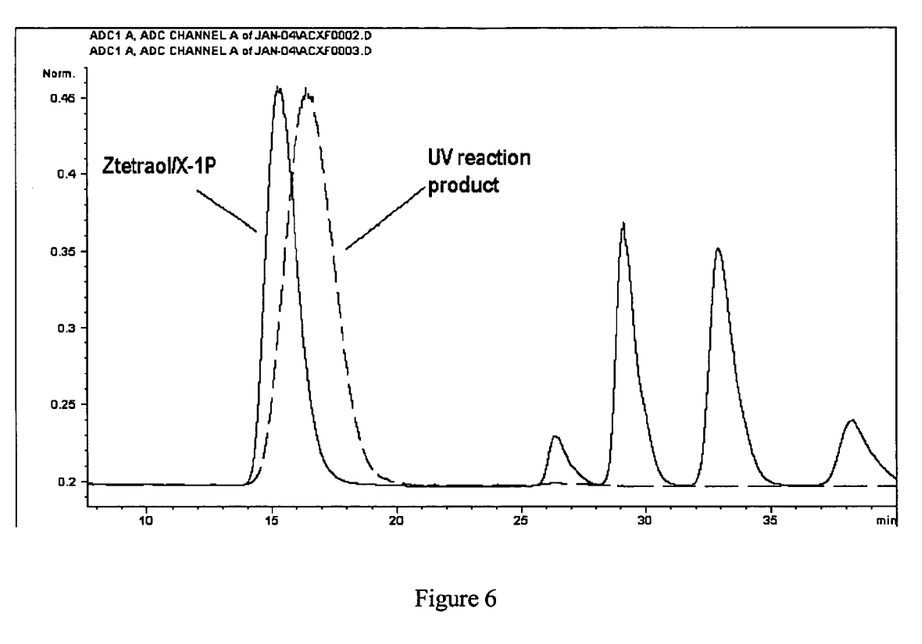
FIG. 6 shows the Gel Permeation Chromatography (GPC) spectra of the mixture of the reactants and the photoreaction product.

FIG. 6 is the Gel Permeation Chromatography (GPC) spectra of the mixture of the reactants and the photoreaction product. Before the photoreaction, GPC of the reactants showed two peaks from the mixture of Ztetraol, the peak at 15.5 min, and X1P, the peaks at 25.6 to 40 min. After the photoreaction, only one peak was found. Since the resulting product had a strong bonding on the GPC column, it came out of the GPC column later than Ztetraol although its molecular weight was higher.

Figure 7:
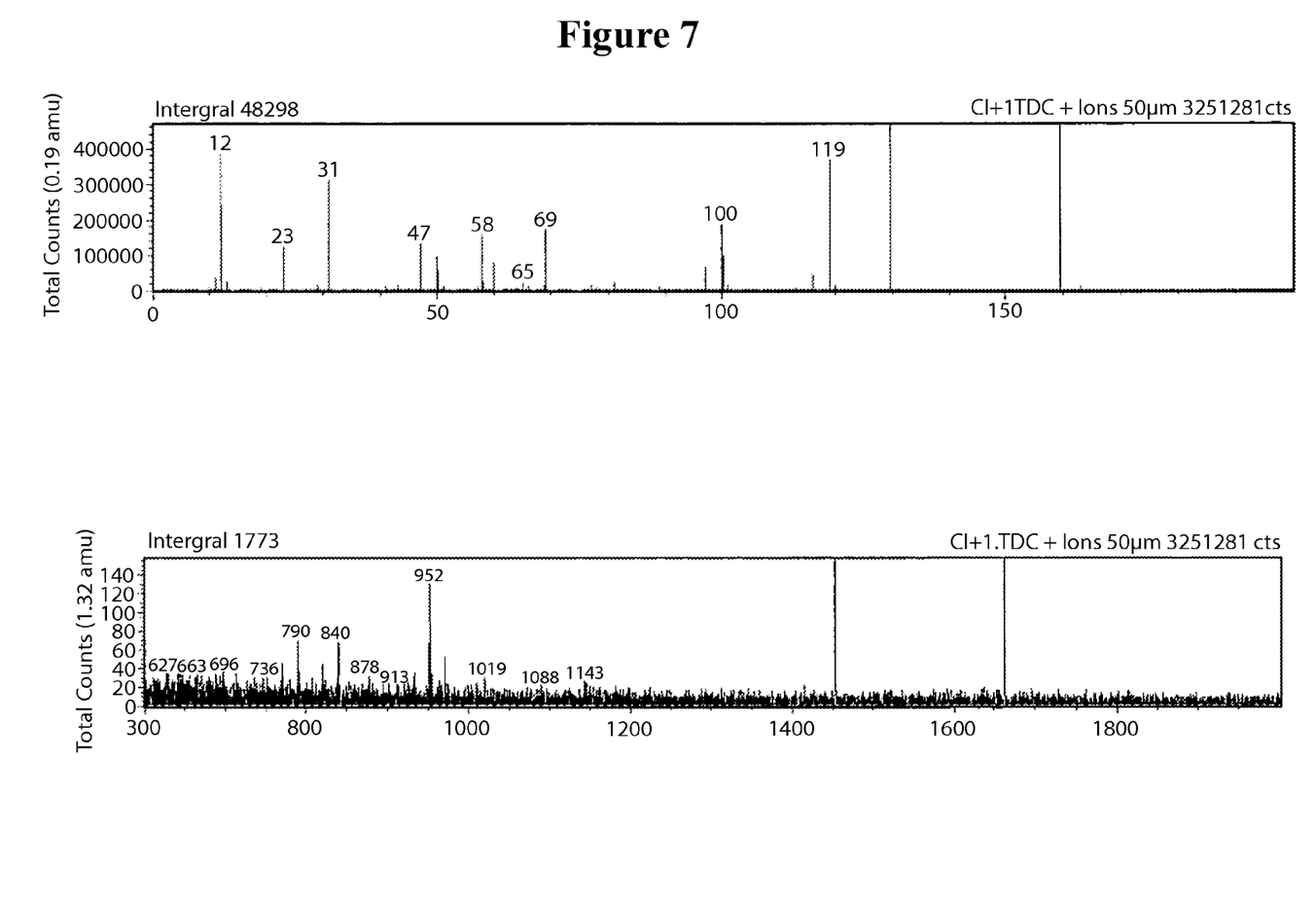
FIG. 7 shows the chemical composition analysis of the GPC peak using Time-of-Flight Secondary Ion Mass Spectroscopy (TOF-SIMS).

The chemical composition analysis of the GPC peak using Time-of-Flight Secondary Ion Mass Spectroscopy (TOF-SIMS) indicated that both PFPE and cyclophosphazene were present (FIG. 7). Moreover, the TOF-SIMS showed that the cyclophosphazene moiety was predominantly bis (4-fluorophenoxy) tetrakis (3-trifluoromethylphenoxy) cyclotriphosphazene. A trifluoromethylphenol substituent was removed by UV irradiation.

The photoreaction by this invention gave surprisingly well-defined chemical structure. Since complicated purification processes for normal synthesis method could be avoided, the yield could be very high, as much as 80%.

The photosynthesized product did not exhibit phase separation, which has been a problem for the application of the X1p additive moiety with a lubricant moiety in a lubricant film of a thin film storage medium.

Figure 8A:
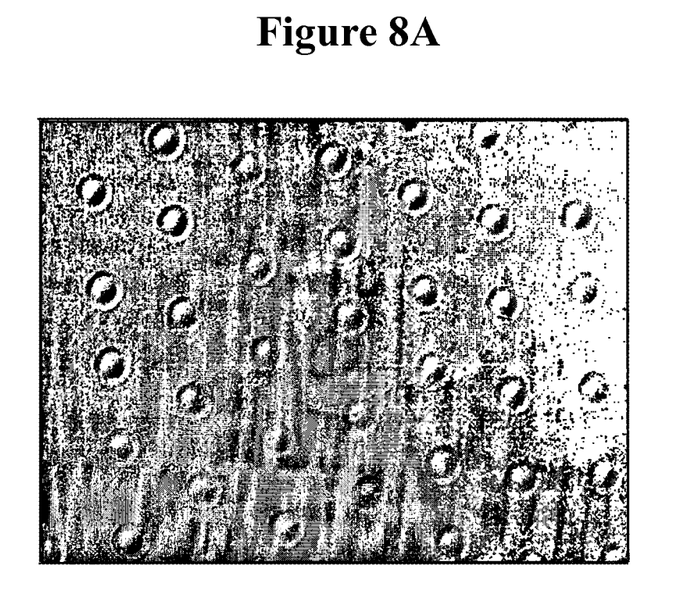
FIG. 8(a) shows that non-photosynthesized lubricant exhibits phase separation when held for 4 days in 80° C., 80 RH condition.

For a dip-lubed Ztetraol containing 1 Å X1p by the conventional method by dipping the disks in a mixture of Ztetraol and X1p, a sign of phase separation showed up after the disks were held for 4 days in 80° C., 80RH condition as shown in FIG. 8(a), which shows optical microscopy image(X500) of disks after 4 days in 80° C., 80RH. Disks are coated with 12 Å Ztetraol and 1 Å X1p.

Figure 8B:
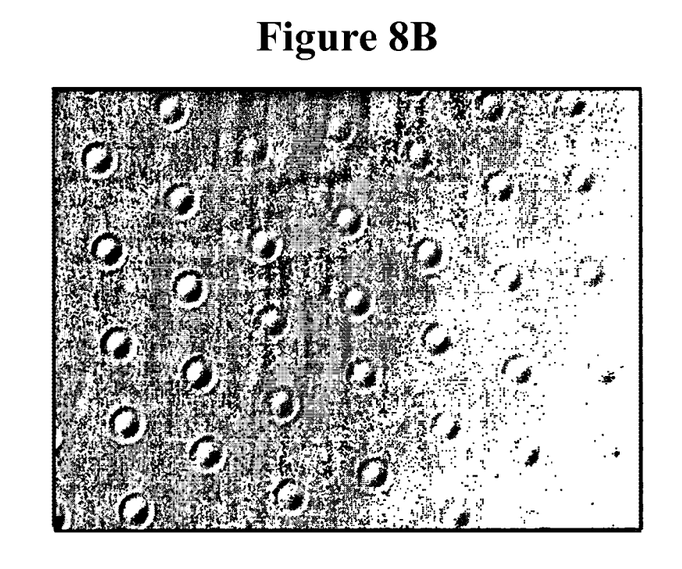
FIG. 8(b) shows that photosynthesized lubricant does not exhibit phase separation when held for 4 days in 80° C., 80 RH condition.

As for the disks coated with the photosynthesized lubricant with a similar X1p content, normal, clean disk surfaces were observed after the same environmental weathering procedure as shown in FIG. 8(b), which shows an optical microscopy image(X500) of disks after 4 days in 80° C., 80RH. Disks are coated with 12 Å photoreaction lubricant containing 1 Å X1p moiety. These results were totally unexpected. Similar results were also observed for disks coated with 15 Å Ztetraol and 1 Å X1p.

Figure 9:
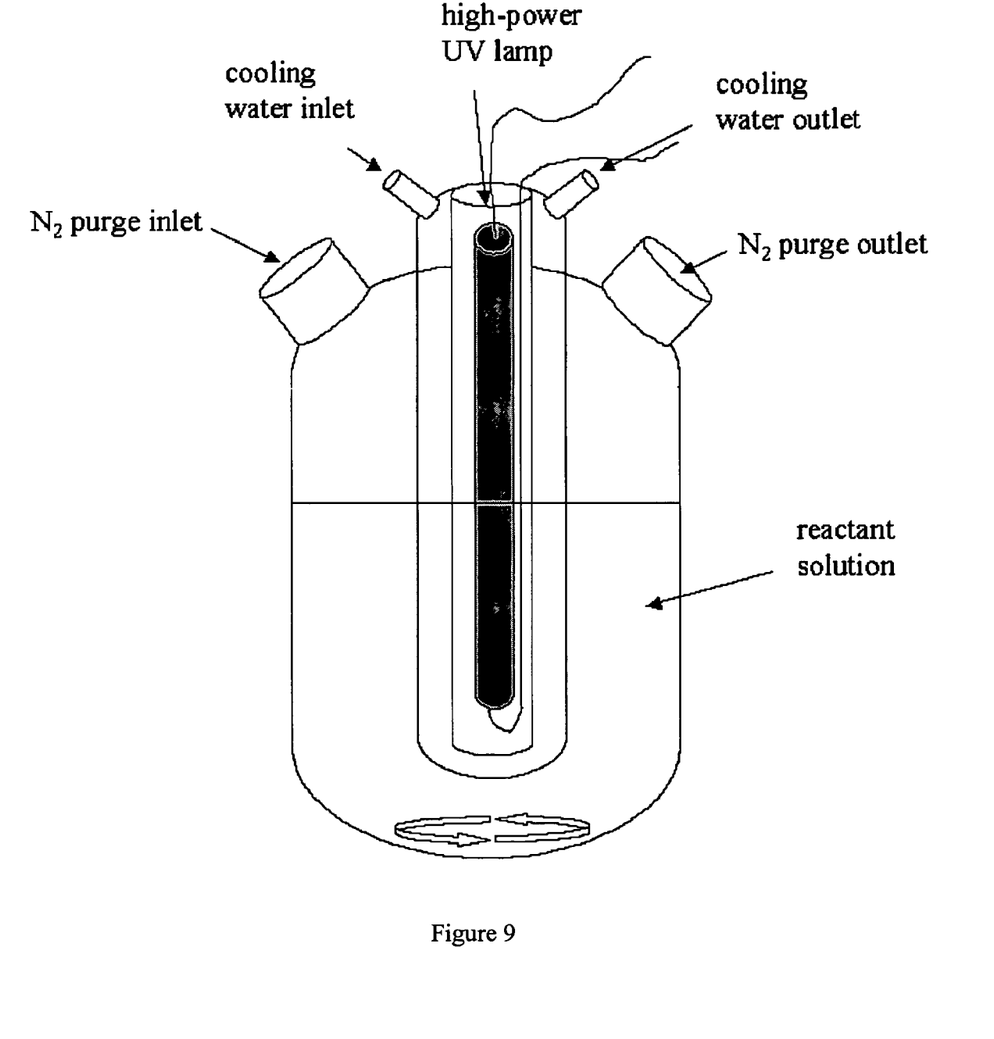
FIG. 9 shows a schematic of the apparatus for manufacturing the photosynthesized lubricant of this invention.

The process of manufacturing the photosynthesized lubricant is shown in FIG. 9, which is described in a co-pending application entitled "ADVANCED LUBRICANT FOR THIN FILM STORAGE MEDIUM," U.S. Ser. No. 10/912,561, which is incorporated herein by reference.

Figure 10:
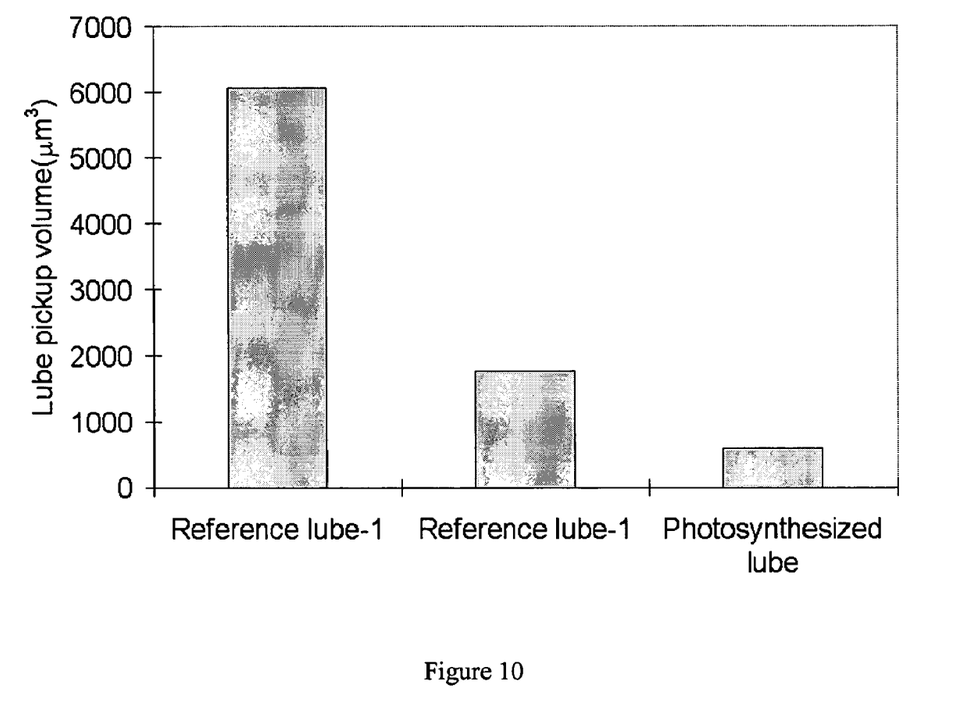
FIG. 10 shows that the photosynthesized lubricant of this invention has substantially less lube pick-up by the recording head than that of non-photosynthesized lubricants.

The photosynthesized lube had good tribological performance. Under stressful environmental start-stop test, the lube showed excellent durability and low stiction/friction. Due to the integration of PFPE and X1P additive by UV synthesis, the lube has lowest lube pickup (on heads) among all several lubes studied (FIG. 10). In particular, the photosynthesized lubricant exhibited substantially less lube pick-up as compared to Reference Lubes 1 and 2 under an identical lube pick up test. Reference Lubes 1 and 2 were Zdol and Ztetraol, respectively. The lube pickup test was a measure of lube volume on heads after heads were flown over media for a certain period of time.

The lubricant moieties include polyfluoroether compositions that may be terminally functionalized with polar groups, such as hydroxyl, carboxy, or amino. The polar groups provide a means of better attaching or sticking the lubricant onto the surface of the recording media. These fluorinated oils are commercially available under such trade names as Fomblin Z®, Fomblin Z-Dol®, Fomblin Ztetraol®, Fomblin Am2001®, Fomblin Z-DISOC® (Montedison); Dennum® (Daikin) and Krytox® (Dupont). The chemical structures of some of the Fomblin lubricants are shown below.

Fomblin Z: Non-reactive end groups

Fomblin Zdol: Reactive end groups

Fomblin AM2001: Reactive end groups

Fomblin Ztetraol: Reactive end groups

The additive moieties that could be added to the lubricant moieties in this invention include X1-p and its derivatives. The thickness of the lubricant coating should be at least 0.5 nm, preferably at least 1 nm, and more preferably at least 1.2 nm and will generally be below 3 nm, preferably in the range from 1 nm to 3 nm. Molecular weight components of particular interest that provide higher film thickness range from 1 kD to 10 kD, preferably from 2 kD to 8 kD.

One way of describing a distribution of molecular components of a polymer, i.e., polydispersity, is to compare the weight average molecular weight defined as $$M_w = \Sigma m_i M_i / \Sigma m_i$$

where mi is the total mass of molecular component in the polymer having a molecular weight $M_i$, with the number average molecular weight defined as $$M_n = \Sigma N_i M_i / \Sigma N_i$$

where $N_i$ is the total number of each molecular component in the polymer having a molecular weight $M_i$. The weight average molecular weight ($M_w$) of a polymer will always be greater than the number average molecular weight ($M_n$), because the later counts the contribution of molecules in each class $M_i$ and the former weighs their contribution in terms of their mass. Thus, those molecular components having a high molecular weight contribute more to the average when mass rather than number is used as the weighing factor.

For all polydisperse polymers the ratio $M_w/M_n$ is always greater than one, and the amount by which this ratio deviates from one is a measure of the polydispersity of the polymer. The larger the $M_w/M_n$ ratio the greater the breadth of the molecular weight distribution of the polymer.

The molecular weight distribution of the vapor phase can be sampled by condensation of the vapor onto a suitable surface, followed by analysis of the condensate in a calibrated size exclusion chromatography system.

It is desirable that the lubricant has a relatively narrow molecular weight distribution of molecular components. In practice, the narrower the distribution the easier it will be to maintain a steady-state concentration of one or more components in the vapor. For example, if the highest and lowest molecular weight components in the polymer have very similar molecular weights, their vapor pressures will also be very similar. On the other hand, if the molecular weights (vapor pressures) are dramatically different heating of the lubricant will require much greater temperature and process control for a steady state concentration to be maintained. The lubricant used in the invention should have an $M_w/M_n$ ratio between 1 and 1.6, preferably between 1 and 1.3, more preferably between 1 and 1.2.

The invention can be practiced with any commercial lubricant with a relatively large or small polydispersity, or with a lubricant that has been pre-fractionated to obtain a lubricant with a relatively small polydispersity. The preferred embodiment of the invention does not involve pre-fractionation of the lubricant. However, pre-fractionated lubricants may be used to provide relatively narrow molecular weight lubricant. If a pre-fractionated lubricant is used in the invention, distillation, chromatography, extraction, or other techniques that allow separation can obtain the pre-fractionated lubricant by molecular weight.

In this application, the word "containing" means that a material comprises the elements or compounds before the word "containing" but the material could still include other elements and compounds. This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A photosensitized lubricant having a single phase composition of at least a lubricant moiety that is chemically linked to an additive moiety, wherein a molecule of the photosynthesized lubricant comprises a main-chain of one or more perfluoropolyether (PFPE) moieties, with a first end of the molecule having a pentaphenoxy cyclotriphosphazene, and wherein a second end of the molecule has an amide group.

2. The photosensitized lubricant of claim 1, wherein the second end of the molecule has an acetamide group.

* * * * *